(12) United States Patent
Nishimura (10) Patent No.: US 6,204,880 B1
(45) Date of Patent: Mar. 20, 2001

(54) VIDEO CAMERA IN WHICH AN IMAGE IS CONSTANTLY FOCUSED

(75) Inventor: Yoshihiko Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/153,071

(22) Filed: Sep. 15, 1998

Related U.S. Application Data (62) Division of application No. 08/181,081, filed on Jan. 13, 1994, now abandoned.

(30) Foreign Application Priority Data

Jan. 25, 1993 (JP) .................................... 5-028526

(51) Int. Cl.⁷ .................................................. H04N 5/232
(52) U.S. Cl. ........................................ 348/240; 348/358
(58) Field of Search ................................ 348/240, 347, 348/358

(56) References Cited

U.S. PATENT DOCUMENTS

| | | | |
|---|---|---|---|
| 4,240,113 | 12/1980 | Michael | 348/458 |
| 4,843,475 | 6/1989 | Imai | 348/240 |
| 4,963,981 | 10/1990 | Todaka et al. | 348/240 |
| 5,083,208 | 1/1992 | Hatanaka | 348/240 |
| 5,181,110 | 1/1993 | Katsumata et al. | 348/561 |
| 5,204,710 | * 4/1993 | Tsukamoto et al. | 348/347 |
| 5,867,217 | * 2/1999 | Okino et al. | 348/358 |

FOREIGN PATENT DOCUMENTS 0315012  1/1991  (JP) ................................ G02B/7/28

* cited by examiner

Primary Examiner—Wendy Garber
Assistant Examiner—Andrew Christensen
(74) Attorney, Agent, or Firm—Ronald P. Kananen; Rader, Fishman & Grauer (57) ABSTRACT

A properly-focused image can be constantly obtained even when a cameraman takes a picture of an object which is located within a defocusing area of a zoom lens. A video camera having a zoom lens (10) detects a distance up to an object by a microcomputer (20) on the basis of position informations (S13), (S14) of a variable power lens (12) and a focusing lens (13) of the zoom lens (10). When this distance enters the defocusing area of the zoom lens in accordance with the movement of the variable power lens (12), the variable power lens (12) is fixed under the properly-focused state, and image data representing an object in the properly-focused state is stored in a memory (34). The image data representing the object is decimated, read out from the memory (34) and also interpolated to thereby form image information corresponding to a desired zoom magnification.

6 Claims, 5 Drawing Sheets

VIDEO CAMERA IN WHICH AN IMAGE IS CONSTANTLY FOCUSED

This application is a division of application Ser. No. 08/181,081 filed Jan. 13, 1994, now abandoned.

BACKGROUND OF THE INVENTION

1. Field of the Invention

The present invention relates to video cameras and, more particularly, to a video camera in which an image can be constantly focused even when a picture is taken of an object located within a defocusing area of a zoom lens.

2. Description of the Related Art

Recently, consumer video cameras have become popular because they have become miniaturized and light in weight by using a solid state imaging device, such as a CCD (charge-coupled device), and a small video tape recorder (VTR) recording unit, such as an 8-mm VTR in one body. Further, an optical system of the imaging unit uses a zoom lens so that a picture of an object can be taken under various lens conditions from a wide angle lens mode to a telephoto lens mode by way of a single zoom lens. Therefore, recent consumer video cameras have become very easy to use.

As is well known, the zoom lens is a lens system that can continuously change a focal distance without changing an image point. The zoom lens is fundamentally comprised of a lens group comprised of a focusing lens unit, a variable power or variator lens unit and a fixed lens unit.

The focusing lens unit is fixed when a zoom lens is operated, and moved when the zoom lens is focused. The variable power lens unit changes the focal length by moving a plurality of sets of lenses separately by using cams, for example, and also constantly keeps a focal surface at a predetermined position. The fixed unit corrects aberration generated in the focusing lens unit and the variable power lens unit determines the range of the focal distance.

A ratio between the maximum focal distance and the minimum focal distance of the zoom lens is referred to as a zoom ratio and consumer video cameras generally use a zoom lens whose zoom ratio is about 6 to 10.

Once focused, the zoom lens has an image point that is not moved even when a zoom magnification is changed. Therefore, the zoom lens can constantly obtain a properly-focused image when a picture is taken of an object that is located at a relatively distant position under a so-called zoom-up mode.

As is well known, lenses have intrinsic minimum object distances corresponding to focal distances and therefore cannot focus an object which is located at a distance which is less than the minimum object distance.

Figure 1:
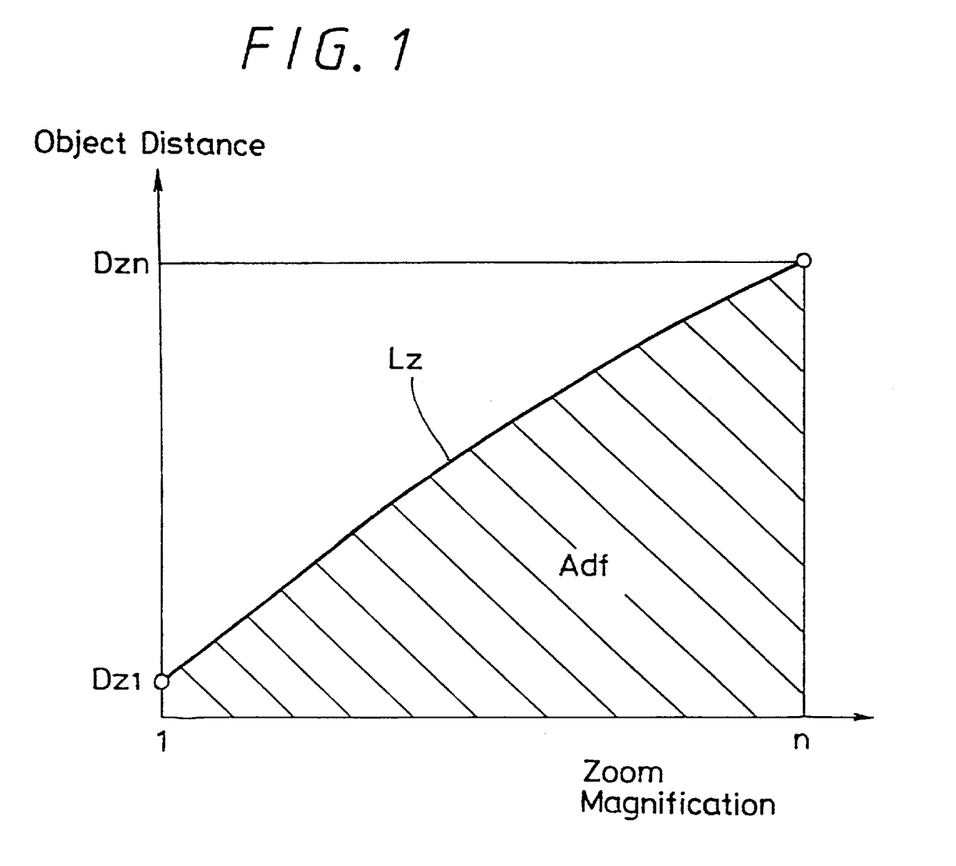
FIG. 1 is a schematic diagram used to explain the invention.

In a zoom lens having a zoom ratio of n, as shown in FIG. 1, the minimum object distance is monotonically increased in response to a zoom magnification in a range of from a minimum object distance Dz1 in which a zoom magnification is one time (maximum wide angle lens state) to a minimum object distance Dzn in which a zoom magnification is n times (maximum telephoto lens Adf in which an object cannot be focused is defined by a curve Lz passing through the minimum object distances Dz1 and Dzn of the maximum wide angle lens state and the maximum telephoto lens state.

A minimum object distance of a zoom lens used in a consumer video camera becomes about 1 cm with the aid of a micro-closeup mechanism when a zoom lens has a zoom ratio of 8 and the zoom lens is set in the maximum wide angle lens mode in which the zoom magnification is one time, and becomes about 100 cm when the zoom lens is set in the maximum telephoto lens mode in which the zoom magnification is 8 times.

Therefore, when a picture is taken of an object which is located at the position greater than the minimum object distance of the maximum wide angle lens state and the position ahead of the minimum object distance of the maximum telephoto lens state by this zoom lens, if the zoom lens is operated from the wide angle lens mode to the telephoto lens mode in a zoom in fashion, then an image can be focused in the beginning because the zoom lens is located outside the defocusing area. Then, the zoom lens soon enters the defocusing area so that an image cannot be focused.

Furthermore, European laid-open patent publication No. 0475840 describes a lens driving apparatus of an inner focusing type in which a velocity sensor coil is wound around a coil of a voice coil type linear actuator in an overlapping fashion. According to European laid-open patent publication No. 0485302, a zoom lens portion in an inner focusing type quartet zoom lens is driven by a stepping motor. The stepping motor is driven in a micro-step driving fashion having low noise and low vibration when the zoom lens is moved at a low speed and also is driven in a high torque pulse driving fashion when the zoom lens is moved at high speed. Therefore, the driving system can be made in high speed, long in lifetime and low in noise and vibration. This previously-proposed technique is for use with a small camcorder (camera-recorder). European laid-open patent publication No. 0560549 describes a camcorder in which, when an optical viewfinder zoom and an electronic zoom are used together, a picture frame whose size is changed in response to a magnification of an electronic zoom is displayed within a viewfinder so that an actual shooting range can be accurately displayed within the viewfinder.

OBJECTS AND SUMMARY OF THE INVENTION

Therefore, it is an object of the present invention to provide an improved video camera in which the aforesaid shortcomings and disadvantages encountered with the related art can be eliminated.

More specifically, it is an object of the present invention to provide a video camera in which a properly-focused image can be constantly obtained even when a cameraman takes a picture of an object that is located within a defocusing area of a zoom lens.

It is another object of the present invention to provide a video camera which enables a picture of a desired object to be taken without worrying about a minimum object distance of a zoom lens even when the object is within a defocusing zone of the zoom lens, and in the same manner as when an object is located outside a defocusing area of the zoom lens.

It is a further object of the present invention to provide a video camera in which a cameraman can carry out zoom-up operation without feeling the existence of a minimum object distance.

It is yet a further object of the present invention to provide a video camera in which a properly-focused image of an object that is located with a distance shorter than a minimum object distance can be obtained.

According to an aspect of the present invention, there is provided a video camera which comprises a zoom lens, a detecting unit for detecting a distance to an object on the basis of positional information from a variable power or variator lens unit and a focusing lens unit included in a zoom lens, a fixing unit for fixing the variable power lens unit in the properly-focused state when the distance detected by the detecting means is approximately equal to a minimum object distance of the zoom lens, in accordance with a movement of the variable power unit, a memory for storing therein image data representing the object in the properly focused state, and a forming unit for forming image information corresponding to a desired zoom magnification from the object image data stored in the memory.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

A video camera according to an embodiment of the present invention will hereinafter be described with reference to FIGS. 2 to 6.

Figure 2:
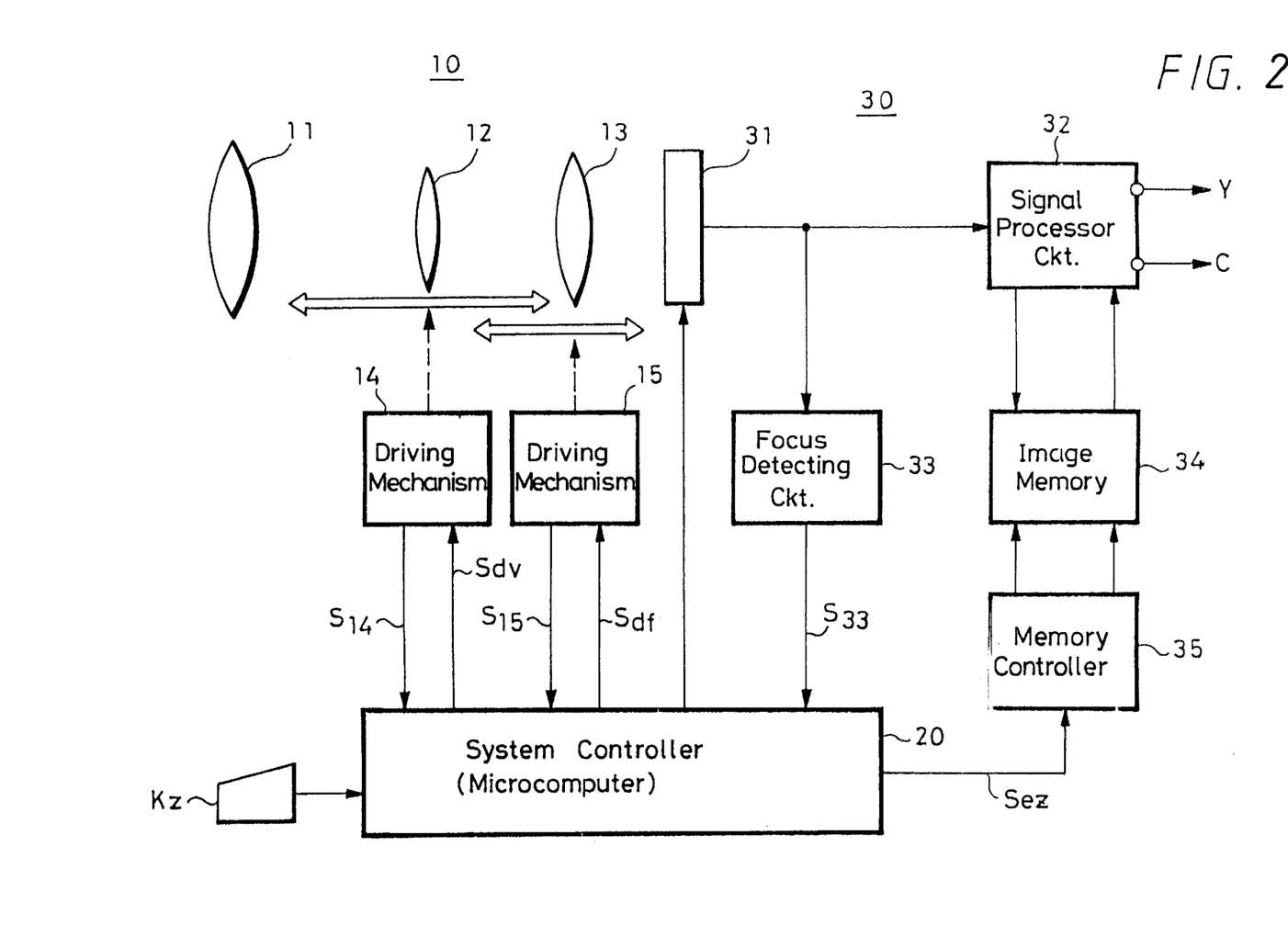
FIG. 2 is a schematic block diagram showing a video camera according to an embodiment of the present invention.

FIG. 2 shows an arrangement of the video camera according to an embodiment of the present invention. As shown in FIG. 2, there is provided a zoom lens 10 of an inner focus type which is comprised of a fixed front lens 11, a movable variable power or variator lens 12 and a focusing lens 13. The variable power lens 12 and the focusing lens 13 are moved by lens driving mechanisms 14, 15, each including a stepping motor (not shown), for example, in the optical axis direction in predetermined ranges, respectively.

A system controller 20 might be formed of a microcomputer and is connected with a zoom operation key Kz. The system controller 20 is supplied with position informations S14, S15 of the corresponding variable power lens 12, the focusing lens 15 from the two lens driving mechanisms 14, 15. Also, the system controller 20 supplies the lens driving mechanisms 14, 15 with signals Sdv, Sdf that are used to drive the respective lenses 12, 13.

An imaging circuit 30 includes a solid state imaging device 31, such as a CCD or the like. An output signal from the solid state imaging device 31 is supplied to an imaging signal processing circuit 32, and the imager signal processing circuit 32 derives a luminance signal Y and a color signal C.

The output signal from the imaging device 31 is supplied to a focus detecting circuit 33 which derives an auto focus focusing information (error signal) S33. This focusing information S33 is supplied to the system controller 20.

In this embodiment, there is further provided an image memory 34 which is formed of a frame memory, for example. The image memory 34 is connected to the imager signal processing circuit 32 so that the images which are picked-up are sequentially stored in the image memory 34.

Write and read in and from the image memory 34 are carried out under the control of a memory control circuit 35. The memory control circuit 35 is operated under the control of the system controller (microcomputer) 20.

Zooming operation of the embodiment of the present invention will be described below.

When a picture is taken, the system controller 20 supplies the lens driving signal Sdf thereof to the lens driving mechanism 15 on the basis of the focusing information S33 from the focus detecting circuit 33 to energize the focusing lens 13 under the control of the auto focusing.

When the key Kz is operated, the system controller 20 supplies the lens driving signal Sdv to the lens driving mechanism 14 to drive the variable power lens 12, thereby increasing the zoom magnification at a variable power speed which doubles per unit time, for example, from one time of the maximum wide angle lens state to n times of the maximum telephoto lens state in response to a time period required when the key Kz is operated.

In this way, under the condition that the zoom lens 10 is properly focused, a distance up to the object is determined uniquely on the basis of the positions of the variable power lens 12 and the focusing lens 13.

The microcomputer 20 calculates a distance Dob to the object and the minimum object distance Dzj corresponding to a zoom magnification ($1 \leq j \leq n$) of the present time of the zoom lens 10 at every field (1/60 second) of an imager signal, for example, on the basis of the position informations S14, S15 of the variable power lens 12 and the focusing lens 13 from the lens driving mechanisms 14, 15 to thereby determine which of the distances Dob and Dzj is longer.

When the distance Dob up to the object is longer than the minimum object distance Dzj of the present time, the properly-focused state is established so that the object is located outside the defocusing area of the zoom lens and is focused. Thus, the optical zooming can be effected by the zoom lens 10.

On the other hand, when the distance Dob to the object is shorter than the minimum object distance Dzj of the present time, the object is located within the defocusing area and cannot be focused.

According to this embodiment, the following electronic zooming is carried out in the defocusing area.

Figures 3A, 3B:
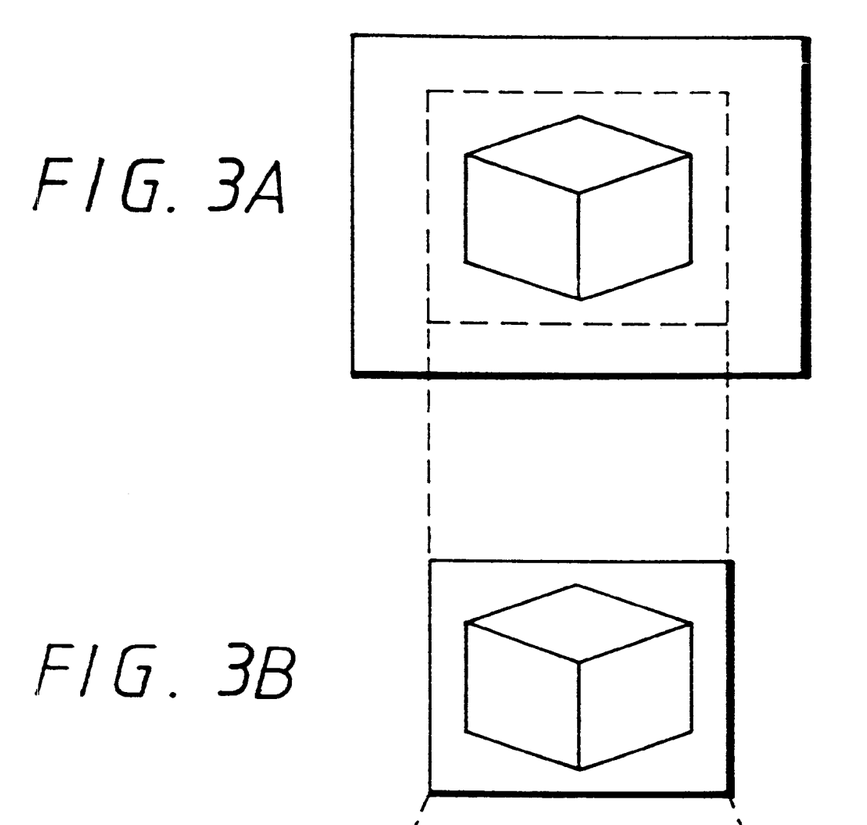
FIGS. 3A through 3C are respectively schematic diagrams used to explain electronic zooming operation according to the embodiment of the present invention.
Figure 3C:
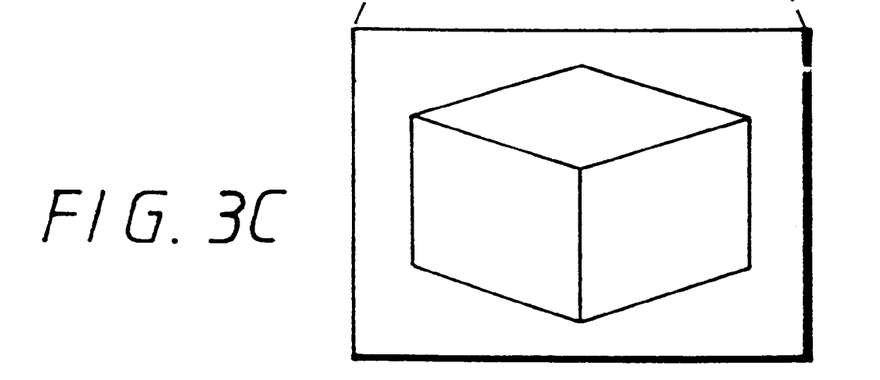

An image of a picture frame corresponding to a zoom magnification at that time is obtained in the manner schematically depicted in FIG. 3B by decimating an image (FIG. 3A) of the properly-focused state presented when the object is located outside of the defocusing area and which is stored in the image memory 34. Also, an enlarged picture corresponding to the zoom magnification as depicted in FIG. 3C is obtained by interpolating the picture of that picture frame in terms of pixels. If the pixel interpolation is a pre-interpolation, then, when pixel data is read out from the image memory 34, the interpolation processing can be effected by reading the same pixel a plurality of times. In the case of mean value interpolation, the interpolation can be effected by a signal processing circuit.

Figure 4:
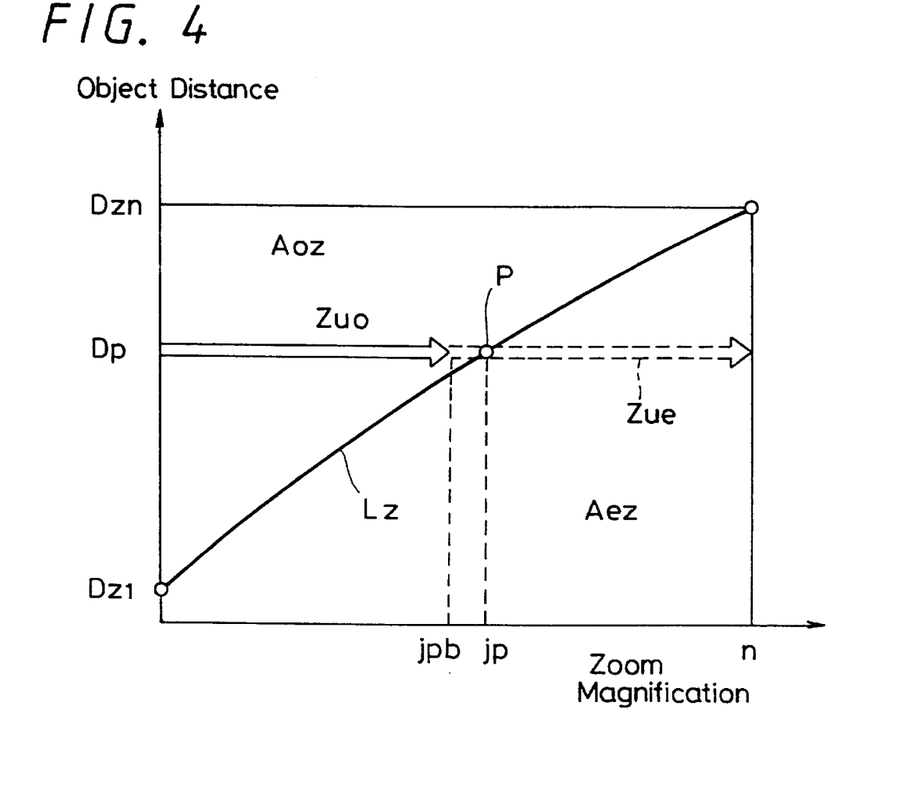
FIG. 4 is a schematic diagram used to explain an example of zooming operation according to the embodiment of the present invention.

As shown in FIG. 4, an optical zooming area Aoz and an electronic zooming area Aez are separated by a curve Lz connecting minimum object distances corresponding to zoom magnifications of 1 to n times. This curve Lz is of course the same as the border line Lz of the defocusing area Adf shown in FIG. 1.

If an object that is located at an intermediate distance Dp between the minimum object distances Dz1 and Dzn of the maximum wide angle lens state and the maximum telephoto lens state, when the zoom in operation is effected by the key kz, the optical zooming is expressed by a horizontal arrow Zuo directed to a point P having a distance Dp on the curve Lz as shown in FIG. 4. The electronic zooming on the other hand, is expressed by a broken arrow Zue in FIG. 4.

As shown in FIG. 4, when the key Kz is depressed, the optical zooming is carried out up to a zoom magnification jpb that is lower than a zoom magnification (1<jp<n) corresponding to the point P. If it is determined by the microcomputer 20 that the optical zooming has reached the zoom magnification jpb that is a limit of this optical zooming by the zoom in operation induced by the depression of the key Kz, then the supply of the lens driving signal Sdv to the lens driving mechanism 14 is interrupted at that timing point tp, whereby the variable power lens 12 of the zoom lens 10 is stopped at the zoom magnification Jpb which is lower than the optical zoom magnification jp and which becomes the minimum object distance at that time. Then, the optical zoom magnification is fixed at that zoom magnification jpb.

Since the optical zoom magnification is fixed at the magnification jpb that is lower than the magnification jp, an image in the properly-focused state is constantly obtained and written in the image memory 34. Incidentally, if the image of the properly-focused state is obtained reliably at the optical zoom magnification jp which becomes the minimum object distance, then the optical zooming can be carried out up to this magnification jp.

After the optical zoom magnification is fixed, an electronic zooming command signal Sez is supplied from the microcomputer 20 to the image memory 34, whereby the images which are picked-up are in a properly-focused state and are sequentially written in the image memory 34 in an appropriately decimated condition in accordance with the electronic zooming magnification. This data is then read out from the image memory 34 and interpolated so that an image corresponding to the target zoom magnification, is obtained.

The electronic zoom magnification kez is calculated such that it is increased from an initial value provided at the timing point tp at which the optical zooming is stopped at the same variable power speed as the above-mentioned optical zoom magnification in response to a time required when the key Kz is further depressed. In the case of this embodiment, the image at the magnification jp is an image which is provided by the electronic zoom.

A synthesized zoom magnification in the electronic Aez, i.e., product (jpb·kez) of the fixed optical zoom magnification and the variable electronic zoom magnification is increased to n of the maximum telephoto lens state of the zoom lens 10 at the same variable power speed as that of the optical zoom.

Thus, the electronic zooming in the electronic zooming area Aez becomes an extension of the optical zooming in the area Aoz as shown by the broken arrow Zue in FIG. 4 with the result that a picture of a desired object can be freely taken similar to the situation wherein a picture of an object located outside the defocusing area is taken, without particularly considering the minimum object distance of the zoom lens.

The electronic zooming is effected by the above-mentioned decimation processing in a manner wherein picture quality is deteriorated as the zoom magnification is increased. Accordingly, when a product (synthesized zoom magnification) of the electronic zoom magnification and the optical zoom magnification are equal, it is desirable that the optical zoom magnification be increased.

Figure 5:
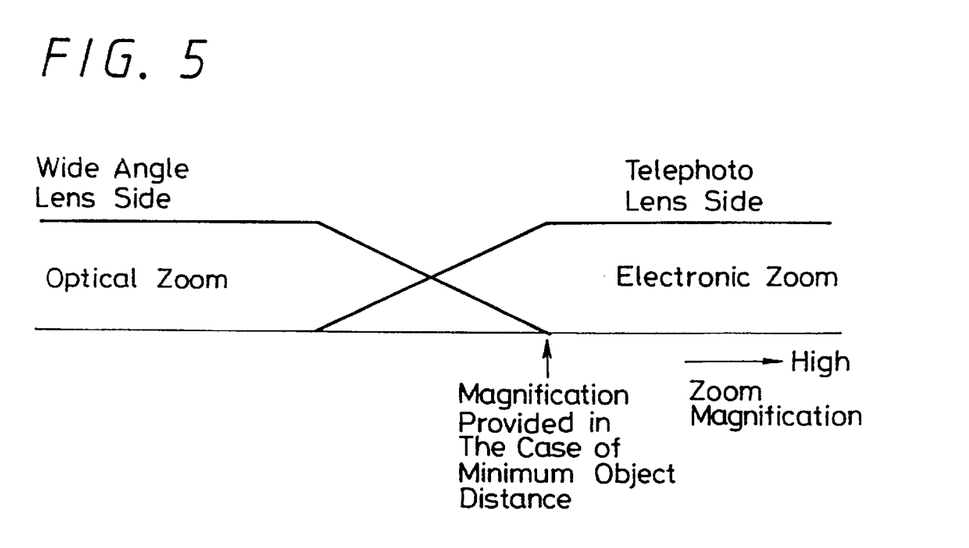
FIG. 5 is a schematic diagram used to explain another example of zooming operation according to the embodiment of the present invention.

Further, it is desirable that the optical zooming is changed to the electronic zooming at a timing point in which the arrow Zuo in FIG. 4 reaches near the point P, or the object distance is larger than the minimum object distance of the zoom lens. At that time, it is predicted that the picture will look unnatural because the electronic zooming cannot begin smoothly after the zoom lens 10 has been de-energized. To avoid this disadvantage, as shown in FIG. 5, it is proposed that the optical zoom and the electronic zoom are both used simultaneously from the magnification lower than the magnification jp that is provided at the point P when the cameraman takes a picture under the condition that the zoom lens is in its minimum object distance. In other words, images provided by the electronic zoom and images provided by the optical zoom are alternately output at every one to a plurality of fields in a range from the magnification lower than the magnification jp provided at the point P in the minimum object distance to the magnification jp at the point P.

Auto focusing operation according to the embodiment of the present invention will hereinafter be described with reference to FIG. 6.

When an angle of a background view is made constant, the optical zoom magnification of the zoom lens 10 is fixed to jq (1<jq<n) and the variable power lens 12 is not moved. If the object approaches under this condition, the focusing lens 13 is operated in an auto focusing fashion by the lens driving signal Sdf generated from the microcomputer 20.

Figure 6:
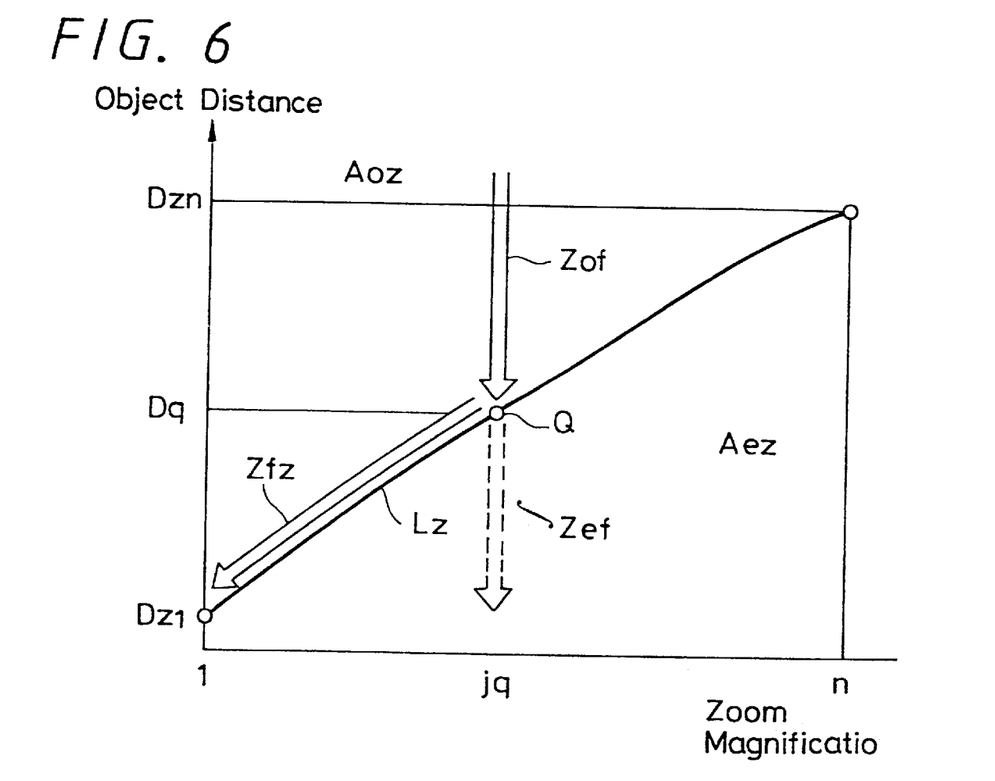
FIG. 6 is a schematic diagram used to explain auto focusing operation according to the embodiment of the present invention.

Therefore, in this case, the auto focusing of the zoom lens is expressed by a vertical open arrow Zof directed toward a point Q on the curve Lz at which a zoom magnification is jq, as shown in FIG. 6.

If the object approaches and a distance between the minimum object distance Dq corresponding to the point Q and the object becomes equal, then the microcomputer 20 determines that the zoom lens reaches the limit of the auto focusing. Then, at this timing point tq, the microcomputer 20 supplies the lens driving signal Sdv to the lens driving mechanism 14 to slightly move the variable power lens 12 toward the wide angle lens side, thereby slightly reducing the optical zoom magnification.

Subsequently, there is output an image that is corrected by an amount of such reduced magnification by the electronic zooming processing using the properly-focused images stored in the image memory 34. In other words, the fact that the optical magnification is changed by the electronic zoom can be concealed.

As the optical zoom magnification is reduced, the minimum object distance of the zoom lens 10 is reduced. Therefore, when the object further approaches the zoom lens 10, the focusing lens 13 is controlled in an auto focusing fashion by the lens driving signal Sdf from the microcomputer 20 to continuously provide properly-focused images which are sequentially written in the image memory 34. The electronic zoom is then carried out by using the properly-focused images which are stored in the image memory 34.

When the object continues to approach the zoom lens, the optical zoom magnification is further reduced and images are repeatedly corrected by the amount of the reduced magnifications by the electronic zoom. A series of the above-mentioned operations is expressed by an open arrow Zfe and a broken arrow Zef extended along the border line Lz of the areas Aoz and Aez in FIG. 6.

Although the size of the image is artifically changed in accordance with the approach of the object only by the optical control, an image whose size is "naturally" changed as the object approaches can be obtained by using the electronic zooming together with the optical zooming while the apparent zoom magnification is not changed.

As basic image data of the image provided by the electronic zoom, a properly-focused image obtained when the optical zoom magnification is reduced is used until the minimum object distance of the reduced optical magnification is reached. Then, when the optical zoom-magnification is reduced, an image provided at the reduced magnification is used.

As described above, it is possible to take a picture using a video camera at an object distance which is shorter than the minimum object distance in an auto focusing mode, using electronic zooming such that the above-mentioned auto focus can smoothly transition to the auto focus operation from the optical zooming area Aoz, as shown by the broken arrow Zef in FIG. 6. Thus, it is possible to freely take a picture of a desired object similar to the case where a picture of an object which is located outside the defocusing area is taken, without particular concern regarding the minimum object distance of the zoom lens.

As described above, according to this invention, the video camera having the zoom lens can, using a microcomputer, detect the distance up to the object on the basis of the position information from the variable power lens unit and the zoom lens focusing unit. When the above-mentioned distance enters the defocusing area of the zoom lens in accordance with the movement of the variable power lens unit, the variable power lens unit is fixed in the properly-focused state and image data representing the object in the properly-focused state is stored in the memory. Then, the image data representing the object is decimated, stored in memory, interpolated, and then used to read-out from the above-mentioned memory to form image information corresponding to a desired zoom magnification. Therefore, it is possible to operate the video camera in a zoom in mode without concious attention being called to the minimum object distance.

When the distance to the object enters the defocusing area of the zoom lens in accordance with the relative movement between the object and the camera, the variable power lens or variator unit is moved so as to decrease the zoom magnification, and the image data representing the object is stored in the memory. Subsequently, image data representing the object is decimated, stored in memory, read out from this memory and then used, after interpolation, to form image information corresponding to a predetermined zoom magnification. Therefore, a properly-focused image of the object that is located at a distance which is less than the minimum object distance, can be obtained.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A video camera comprising:
   optical zooming apparatus including a variable power lens unit and a focusing lens unit;
   detecting apparatus for detecting a distance to an object on the basis of a position of the variable power lens unit and a position of the focusing lens unit;
   fixing apparatus for fixing the variable power lens unit in a properly-focused state when the distance to the object is approximately equal to, but less than, a minimum object distance of the variable power lens unit in accordance with a movement of the variable power lens unit;
   a memory in which image data representing an object in the properly-focused state is stored; and
   electronic zooming apparatus for providing electronic zoom by reading out the image data, and forming data for an electronic zooming image which is enlarged in accordance with a desired zoom magnification,
   wherein a synthesized image is created by alternately outputting the electronic zooming image and an image provided by the optical zooming apparatus at every one to a plurality of fields when the desired zoom magnification is in a range between a magnification related to the distance to the object and a magnification related to the minimum object distance.

2. The video camera as claimed in claim 1, wherein said object is enlarged by said variable power lens unit and subsequently said object is enlarged using image data which is read out of said memory when the distance detected by said detecting apparatus is less than said minimum object distance.

3. The video camera as claimed in claim 1, wherein said variable power lens unit is controlled so as to decrease said zoom magnification when the distance between said camera and said object decreases.

4. The video camera as claimed in claim 1, wherein said electronic zooming apparatus interpolates the image data such that pixels are interpolated in accordance with an enlargement of said image using a pre-interpolation technique wherein the same pixel is read out a plurality of times.

5. The video camera as claimed in claim 1, further comprising a manually manipulatable zoom magnification control key, wherein a rate of movement of said variable power lens is in response to an operation of said control key and a rate at which image enlargement is carried out using the data stored in said memory are controlled to be substantially equal.

6. A video camera comprising:
   an optical zoom unit for providing optical zooming including a variator lens, a focusing lens and a fixed front lens;
   drive apparatus for moving the variator lens with respect to the fixed front lens in response to the manipulation of a control key;
   distance detection apparatus for detecting a distance to an object on the basis of a positional relationship with the variator lens and the focusing lens within the optical zoom unit;
   apparatus for fixing the variator lens in a position wherein an image of the object is in focus when the distance to the object is approximately equal to, but less than, a minimum object distance of the optical zoom unit;
   an electronic zoom unit for providing electronic zooming including an apparatus for compressing data representing the image of the object in focus and storing the image in a memory; and
   an apparatus for reading the compressed image data out of the memory, interpolating the compressed image data and forming data for an image which is enlarged at a rate which is essentially equal to a rate at which the variator lens is moved by the drive apparatus, wherein a synthesized image is created by alternately outputting the compressed image data and image data provided by the optical zoom unit at every one to a plurality of fields when a desired zoom magnification is in a range between a magnification related to the distance to the object and a magnification related to the minimum object distance.

* * * * *